(12) United States Patent
Lei et al.

(10) Patent No.: US 11,812,773 B1
(45) Date of Patent: Nov. 14, 2023

(54) FORMULATED PECTIN COMPOSITION FOR LOWERING FOOD GI VALUE, THE PREPARATION METHOD THEREOF, AND THE METHOD FOR PREPARING LOW GI FOOD

(71) Applicant: Chengdu Shangyi Information Technology Co., Ltd., Sichuan (CN)

(72) Inventors: Chi Lei, Sichuan (CN); Huimin He, Sichuan (CN); Jun Yin, Sichuan (CN); Huilin Xu, Sichuan (CN); Chengyuan He, Sichuan (CN); Zhen Lei, Sichuan (CN)

(73) Assignee: CHENGDU SHANGYI INFORMATION TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/206,713

(22) Filed: Jun. 7, 2023

(30) Foreign Application Priority Data

Mar. 8, 2023 (CN) .......................... 202310213867.4

(51) Int. Cl.
| | |
|---|---|
| *C12C 1/00* | (2006.01) |
| *A23L 29/231* | (2016.01) |
| *A21D 2/18* | (2006.01) |
| *A23K 20/163* | (2016.01) |
| *A23L 7/109* | (2016.01) |
| *A21D 13/06* | (2017.01) |

(52) U.S. Cl.
CPC .............. *A23L 29/231* (2016.08); *A21D 2/18* (2013.01); *A21D 13/06* (2013.01); *A23K 20/163* (2016.05); *A23L 7/109* (2016.08)

(58) Field of Classification Search
CPC ..... A23L 29/231; A23L 7/109; A23K 20/163; A21D 2/18; A21D 13/06
USPC ......................................................... 426/658
See application file for complete search history.

(56) References Cited

U.S. PATENT DOCUMENTS

| | | | |
|---|---|---|---|
| 7,422,764 B2 | 9/2008 | Koren | |
| 2003/0198726 A1* | 10/2003 | Navarro Y. Koren | .... A23L 2/52 |
| | | | 426/590 |
| 2007/0202225 A1* | 8/2007 | Chevalier | ............. A23L 29/231 |
| | | | 426/302 |

\* cited by examiner

*Primary Examiner* — Brent T O'Hern

(57) ABSTRACT

The present disclosure provides a formulated pectin for reducing food GI, comprising low-ester pectin and metal salt of bivalent/trivalent cation, with or without soluble polysaccharides. The components of the formulated pectin, according to the present disclosure, are synergistic with each other and can be added to a carbohydrate-based medium and high GI food to achieve the effect of lowering the GI value of the food through a unique physical reaction in the gastrointestinal tract, thereby obtaining a corresponding low GI food. In preparing the low GI food containing said formulated pectin of the present disclosure, only a small amount of said formulated pectin is required to be added to the raw material, and then customarily cooked or baked, allowing little effect on the processing, and almost no impact on the food taste and status. The food can be effective over a wide range of cooking temperatures.

7 Claims, 11 Drawing Sheets

FORMULATED PECTIN COMPOSITION FOR LOWERING FOOD GI VALUE, THE PREPARATION METHOD THEREOF, AND THE METHOD FOR PREPARING LOW GI FOOD

TECHNICAL FIELD

The present disclosure is in the field of food technology, in particular, relates to a formulated pectin composition for lowering food glycemic index (GI) value, a method for preparing the same and the method for preparing low GI food.

BACKGROUND

The food glycemic index (GI) reflects the ability to elevate postprandial blood glucose after eating food. According to different GI values, foods are divided into high GI (GI>70), medium GI (55<GI<70) and low GI (GI<55) foods. The higher the GI value, the faster the glycemic response and the post-prandial blood glucose peak are relatively higher. High GI food is extremely unfriendly to metabolic diseases, such as increasing the risk of obesity, diabetes, hyperlipidemia, hypertension, and the incidence of related complications. The food GI value is most closely related to diabetes mellitus. The number of type II diabetic patients is huge and growing rapidly worldwide. The control of elevated blood glucose is the first dietary principle for diabetic patients to control the development of disease, in which low GI food is essential.

At present, many solutions for low GI baked food are to replace refined wheat flour with coarse cereals, increase the proportion of insoluble dietary fiber in carbohydrate sources, reduce the absorption of sugar in the small intestine, and slow down the rising rate of postprandial blood glucose, so as to reduce food GI value. For example, Xiaoyan Dai, etc. prepared low GI flour (CN100376165C) by using bran powder made from coarse cereal peel, rice bran, and bran as the main ingredients. Hong Bian etc. prepared low GI dough and pastry by completely replacing wheat flour with buckwheat flour (CN101292672B). Meanwhile, Wei Zhao, etc. prepared low GI buckwheat premix powder using modified buckwheat powder and hydrocolloid as main components (CN110089536A).

In addition, there is a patent on a viscous dietary fiber typified by pectin, guar gum, to increase the viscosity of stomach contents and retard the rate of gastric emptying, thereby achieving lower food GI value. For example, Patent CN102291997B slows the digestion and emptying speed of biscuits in the stomach by adding guar gum to biscuits, thereby lowering GI. Similarly, in the overseas patent HU226088B1, guar gum is added in an appropriate amount to the low GI flour dedicated to diabetics to increase the viscosity of the food to assist in lowering the GI. In US10 010102B2, viscous substances such as guar gum, xanthan gum and alginate are added to increase food viscosity to control the rising of blood glucose after food meals. However, there are obvious drawbacks to using of one or several viscous dietary fibers alone or in combination. On the one hand, the addition of the amount of viscous dietary fiber alone to achieve the hypoglycemic effect is higher, and of which the cost is higher; on the other hand, viscous dietary fiber has good water absorption, and it tends to form lumps when mixing with water, and the addition of slightly higher dietary fiber will affect the taste and even have the risk of suffocation.

Therefore, the existing technologies for lowering medium/high GI foods are mainly developed from the perspective of adding coarse cereals and viscous dietary fibers, and it is often difficult to consider such factors as cost, effect and taste. On the one hand, baked goods are popular with common consumers; on the other hand, since the manufacturing process of baked goods is often high-precision with high-sugar addition, which is not suitable for patients with diabetes, it is significant to develop a technology that can change the medium/high GI baked goods into low GI food by adding a small amount.

SUMMARY OF THE INVENTION

It is an object of the present disclosure to provide a formulated pectin composition for lowering food GI value, a method for preparing the same, and a method for preparing low GI food. The addition of the formulated pectin composition in a carbohydrate-based food can obtain low GI food without or with minor amounts of coarse cereals and hardly affect the sensory and taste of the food.

The present disclosure provides a formulated pectin composition for lowering food GI value, comprising the following components: low-ester pectin and metal salt of bivalent/trivalent cation, the esterification degree of the low-ester pectin is 20-50%.

Preferably, the composition further comprises at least one soluble polysaccharide.

Preferably, the composition comprises the following components in the following percentages by weight: low-ester pectin 50-90% and bivalent/trivalent cation metal salt 10-50%.

Preferably, the composition comprises the following components in the following percentages by weight: low-ester pectin 35-80%, bivalent/trivalent cation metal salt 8-35%, soluble polysaccharide 10-30%; low-ester pectin 35-80%, bivalent/trivalent cation metal salt 5-33%, soluble polysaccharide 15-35%; or low-ester pectins 30-70%, bivalent/trivalent cation metal salt 6-25%, soluble polysaccharides 19-57%.

Preferably, the bivalent/trivalent cationic metal salt includes one or more selected from calcium, magnesium, ferrous, ferric, aluminum, and chromium salts.

The present disclosure also provides a method for the preparation of the formulated pectin composition as described above, comprising the following steps: mixing bivalent/trivalent cation metal salt, part of the low-ester pectin and one of the soluble polysaccharides to obtain a premix;

total mixing of the remaining low-ester pectin with the remainder of the soluble polysaccharides and the premix to obtain the formulated pectin composition.

The present disclosure also provides the use of the formulated pectin composition as described above for lowering food GI value.

The present disclosure also provides the use of the formulated pectin composition as described above in the preparation of a carbohydrate-based low GI food with no or low coarse grain content.

The present disclosure also provides a low-GI food, and raw materials of the low-GI food comprise the formulated pectin composition as described above.

The present disclosure further provides a method for preparing the low GI food described above, comprising the following step: the formulated pectin composition described above is added when mixing the raw materials.

Benefits: the present disclosure provides a formulated pectin composition for lowering food GI value, wherein the low-ester pectin undergoes a relatively strong bridging reaction with a bi/trivalent cation in the acidic environment of the stomach, and the arabinoxylan undergoes a complex cross-linking reaction with the low-ester pectin, so that the connectivity between the interior of chyme is enhanced and tightly bound, providing a form similar to an "embedded shell" on the surface of the chyme, so that the carbohydrate therein is released more slowly in the stomach, resulting in a slower rate of carbohydrate digestion into the intestinal tract and absorption into blood, so as to reduce the postprandial glycemic response. In the meantime, low-ester pectin, arabinoxylan and guar gum as soluble dietary fiber would increase the volume of chyme, delay the rate of gastric emptying, and also reduce the rate of blood glucose response to a certain extent; second, the use of guar gum in combination with arabinoxylan can greatly enhance the mouthfeel of low GI food such as bread while reducing the postprandial glycemic response.

With the formulated pectin composition of the present disclosure, the GI value of a carbohydrate-based food or a medium/high GI food can be greatly lowered, and without a large amount of or even without coarse food having a high cellulose content, only by adding a small amount of the formulated pectin composition and then performing normal cooking or baking, the processing technology is less affected, the GI can be effectively reduced, the taste and state of the food are hardly affected, and it can still be effective over a wide range of cooking temperatures.

BRIEF DESCRIPTION OF THE DRAWINGS

In order to illustrate the embodiments of the present disclosure or the technical solutions in the prior art more clearly, a brief description will be given below with reference to the accompanying drawings, wherein it is obvious that the drawings in the following description are only exemplified embodiments of the present disclosure, and those skilled in the art would have been able to obtain other drawings according to these drawings without involving any inventive effort.

DETAILED DESCRIPTION

Figure 1:
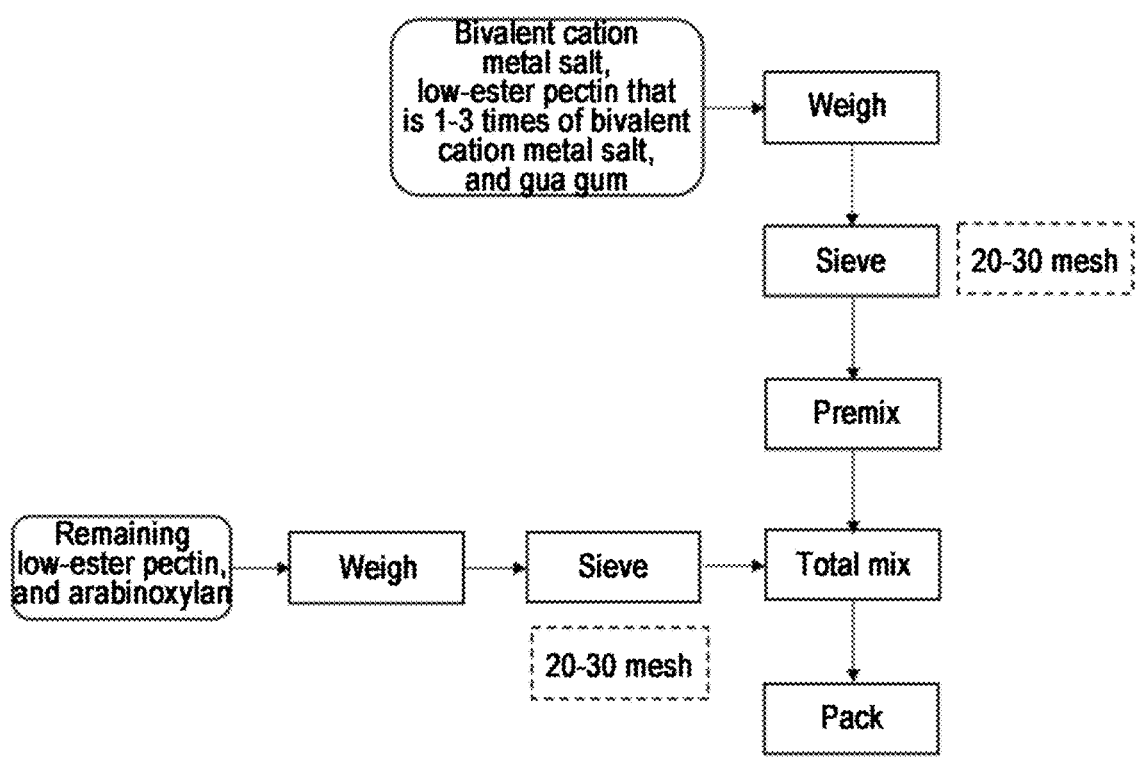
FIG. 1 exhibits the process flow for the preparation of the formulated pectin composition.

The present disclosure provides a formulated pectin composition for lowering food GI comprising the following components: low-ester pectin and bivalent/trivalent cationic metal salt;

the esterification degree of the low-ester pectin is 20-50%.

The formulated pectin compositions of the present disclosure must comprise low-ester pectin and bivalent/trivalent cationic metal salt, with or without at least one soluble polysaccharide. The present disclosure does not specifically define the type of said low-ester pectin. It can be instant low-ester pectin or regular non-instant low-ester pectin, and the examples demonstrate that the instant low-ester pectin has a better effect. The soluble polysaccharide of the present disclosure preferably comprises guar gum and/or arabinoxylan.

In the present disclosure, when the components of the formulated pectin composition are different, the ratio thereof is slightly different, for example, when only the essential components are contained, the mass ratio thereof is preferably: low-ester pectin 50-90% and bivalent/trivalent cationic metal salt 10-50%; when one of the soluble polysaccharides is contained in the components, the mass ratio thereof is preferably low-ester pectin 35-80%, bivalent/trivalent cation metal salt 7-35%, and soluble polysaccharide 10-35%; and when the soluble polysaccharide is guar gum, the ratio is preferably: low-ester pectin 35-80%, bivalent/trivalent cationic metal salt 8-35% and guar gum 10-30%; when the soluble polysaccharide is arabinoxylan, the ratio thereof is preferably: low-ester pectins 35-80%, bivalent/trivalent cationic metal salt 5-33% and arabinoxylans 15-35%; when the soluble xylan is a mixture of guar gum and arabinoxylan, the ratio is preferably: low-ester pectin 30-70%, bivalent/trivalent cationic metal salt 5-25%, guar gum 9-27% and arabinoxylan 10-30%.

The bivalent/trivalent cation metal salt referred to herein is preferably metal salt that is insoluble or sparingly soluble in water and readily soluble in hydrochloric acid, and more preferably comprises one or more selected from calcium, magnesium, ferrous, ferric, aluminum, and chromium salts, and most preferably one or more selected from calcium hydrogen phosphate, calcium phosphate, calcium carbonate, and calcium dihydrogen phosphate.

The low-ester pectin of the present disclosure is a soluble dietary fiber that plays a vital role in maintaining R cell metabolism and promoting survival under stress conditions by protecting cells from inflammation and oxidative stress and is, therefore, of great value for dietary intervention in diabetic patients. Due to the solubility of the bivalent/trivalent metal cation, no bridging reaction will occur during the preparation of the product, the preparation process will not be affected, and the addition amount thereof will not be minimal. However, after entering the gastric acid environment, the cation precipitates out and combines with the low-ester pectin, and a bridging reaction will occur, allowing the effect of slow-release carbohydrates. The bridging reaction forms a stable "egg box" model, thus forming a semi-solidified gel; the viscosity dramatically increases, the level of solid content in the solution has little effect on the gel, and it even can make the connection between solids more compact, in the meantime, the surface is protected by gel shrinkage, so that the solid is not easy to be destroyed, which has the effects of delaying gastric emptying, reducing the absorption rate of carbohydrates, etc., thus serving the purpose of lowering blood glucose.

Regular pectin tends to dissolve much more complex than small molecules (usually crystalline). Pectin is highly susceptible to hydration upon initial contact with water, i.e. water can only penetrate to a limited extent to the surface of the powder particles, locally converting the glassy region to a rubbery state, and subsequently swelling to form a viscous and often viscous surface gel. Especially the surface of the particles is viscous, allowing the particles to adhere to each other and forming lumps. Generally, the lumps would not be destroyed unless very high shear rates. This has a serious effect on its rate of dissolution by dispersion and the ability and time required to reach maximum viscosity. That is, the common poorly soluble low-ester pectin would affect the "bridging reaction" with bivalent cations due to the hydration reaction, thereby affecting the effect of reducing food digestion in the stomach.

In the case of powders, the initial dissolution rate of the dispersed particles upon contact with water depends substantially on the surface area of the particles, which depends on the concentration of the particles, the initial particle size, the particle size distribution, the shape, the porosity and the residual solvent content, all of which change as the powder gradually dissolves. Therefore, the low-ester pectin of the present disclosure is an instant low-ester pectin treated by a swelling process to increase the surface area and porosity of pectin particles, thereby achieving rapid dispersion and dissolution after mixing water. The tests revealed that compared with regular pectin, the instant pectin had significantly better hydration rate and maximum viscosity.

Among the optional components of the present disclosure, guar gum has a hypoglycemic effect but affects mouthfeel, whereas the combination of guar gum with arabinoxylan (AX) improves the mouthfeel; said arabinoxylan is a soluble hemicellulose, which has a hypoglycemic effect.

In the formulated pectin composition of the present disclosure, a relatively strong bridging reaction occurs between the low-ester pectin and calcium ions in the acidic environment of the stomach, and a complex cross-linking response occurs between the arabinoxylan and the low-ester pectin, so that the connectivity between the interior of chyme is enhanced and tightly bound. A morphology similar to an "embedded shell" is also formed on the surface of the chyme, allowing a slower release of carbohydrates in the stomach, resulting in a slower absorption rate of carbohydrates into the blood, reducing the postprandial blood glucose response. Meanwhile, low-ester pectin, arabinoxylan, and guar gum as soluble dietary fiber will increase the volume of chyme, delay gastric emptying, and reduce the rate of blood glucose response to a certain extent. Second, combining guar gum and arabinoxylan can significantly improve mouthfeel while reducing postprandial glycemic response. The components of the formulated pectin composition of the present disclosure are synergistic with each other, and the effect of the low-ester pectin+calcium salt+guar gum+arabinoxylan is significantly better than that of the low-ester pectin+guar gum+arabinoxylan, and that of the low-ester pectin+calcium salt+guar gum. The purpose of lowering food GI value can be achieved through the unique physical reaction in the gastrointestinal tract, and even the typical non-coarse cereal food with a medium-high GI can be lowered to low GI food so that people with diabetes do not need to choose between controlling blood glucose and improving mouthfeel.

The present disclosure also provides a method for preparing the formulated pectin composition described above, as shown in FIG. 1, comprising the following steps: mixing bivalent/trivalent cation metal salt, one sugar of soluble polysaccharides and part of low-ester pectin to obtain a premix;

total mixing of the remainder of the low-ester pectin with the remainder of the sugars of the soluble polysaccharide and the premix to obtain the formulated pectin composition.

In the preparation of the premix of the present disclosure, the mass of the low-ester pectin is preferably 1-3 times the mass of the bivalent/trivalent cation metal salt, and prior to mixing, it is preferred that the above raw materials are separately sieved, more preferably separately sieved through 20-30 mesh, and the undersize is mixed, and the soluble polysaccharide used while mixing is preferably guar gum. The mixing, according to the disclosure, is preferably carried out in a mixer.

In the present disclosure, it is preferred to sieve the remaining low-ester pectin and the remaining sugar in the soluble polysaccharide through a 20-30 mesh, respectively, and to subject the undersize to total mixing with the above-mentioned premix, said total mixing preferably also being carried out in a mixer. When the total mixing is carried out in the present disclosure, the remaining saccharide in the selected soluble polysaccharide is preferably arabinoxylan. The present disclosure can improve mixing uniformity by performing fractional premixing on different components.

The present disclosure also provides the use of the formulated pectin composition as described above for lowering food GI value.

The formulated pectin composition of the present disclosure can be used in food with a higher refined carbohydrate and medium/high GI food to lower food GI value, even for the purpose of changing medium/high GI food into low GI food, such as baked food like bread, cakes, biscuits, etc., and fine grain food like noodles, steamed bread, rice porridge, etc.

In the present disclosure, when using the formulated pectin composition to reduce the GI value in food, it is preferably only necessary to add the formulated pectin composition to the food material of which the GI value should be lowered. The mass content of the formulated pectin composition in the finished food is preferably >1%, more preferably 4-8%.

The present disclosure also provides the use of the formulated pectin composition as described above in the preparation of a carbohydrate-based low GI food with no or low coarse grain content.

The application of the present disclosure is the same as those to described above, and will not be repeated here.

The present disclosure also provides a low GI food, and raw material of the low GI food comprise the formulated pectin composition as described above.

In the low GI food of the present disclosure, in order to obtain a food containing a refined high-carbohydrate, medium/high GI food without the addition of the formulated pectin composition to the raw material, it is only necessary to add the formulated pectin composition to the raw material and perform normal operations, such as cooking or baking, so as to obtain the low GI food.

The present disclosure also provides a method for preparing the low GI food described above, comprising the following step: the formulated pectin composition described above is added while mixing the starting materials.

The formulated pectin composition of the present disclosure is present in an amount of not less than 1%, more preferably 4-8% by weight of the final food. In the present disclosure, when adding said formulated pectin composition, said formulated pectin composition can be added into raw materials during food preparation, for example, as a pre-mixed powder of bread and cake, baked after being mixed with other materials, or added to flour during noodle preparation, etc. Meanwhile, the baking/cooking temperature should be <180° C. while the subsequent operation is performed, and if the baking/cooking temperature is 160-180° C., the baking/cooking time is not more than 30 minutes, preferably not more than 20 minutes.

In order to further illustrate the present disclosure, a formulated pectin composition for lowering food GI provided by the present disclosure and the preparation method thereof and the method for the preparation of low GI food are described in detail below in conjunction with the accompanying drawings and examples, but they cannot be interpreted as a limitation of the protection scope of the invention.

The raw materials selected in the formulated pectin powder of the examples and comparative examples are as follows:

TABLE 1

Raw Material Information

| Name | Supplier/Manufacturer | Cat No. | Net content of active ingredients |
|---|---|---|---|
| Low-ester pectin powder (instant type) | Yantai DSM Andre Pectin Co., Ltd. | APC200•YI | 70% |
| low-ester pectin powder (non-instant) | Yantai DSM Andre Pectin Co., Ltd. | APC200-Y•HN | 70% |
| Guar gum powder | Shree Ram Bean Gum Chemical Co. Ltd. India | Ramcol F-21 | 82% |
| Arabinoxylan powder | Shaanxi Benhe Bioengineering Co., Ltd. | — | ≥99% |
| Calcium hydrogen phosphate powder | Henan Jianjiu Industrial Co., Ltd. | — | ≥99% |
| Ferric pyrophosphate | Hangzhou Zhongtuan Shihua Food Ingredients Co., Ltd. | — | Iron content 25% |

Note:
the ratio of the active components in the examples and comparative examples should be calculated based on the net content of the active components.

Example 1

Viscosity comparison of regular low-ester pectin, instant low-ester pectin, regular insoluble low-ester pectin+calcium salt, instant low-ester pectin+calcium salt at pH=3.

In this study, regular insoluble low-ester pectin and instant low-ester pectin products processed by special technology were selected, wherein the content of low-ester pectin in the two pectin products was the same.

The test samples were as follows:
Sample 1: regular insoluble low-ester pectin 3 g;
Sample 2: instant low-ester pectin 3 g;
Sample 3: regular insoluble low-ester pectin 3 g+calcium hydrogen phosphate 0.43 g;
Sample 4: instant low-ester pectin 3 g+calcium hydrogen phosphate 0.43 g;

Test procedure: each sample was placed into 100 ml hydrochloric acid solution with pH=3, stirred with a glass rod, stand after evenly stirring, and the viscosity of three samples at different time points was measured by a viscometer.

Figure 2:
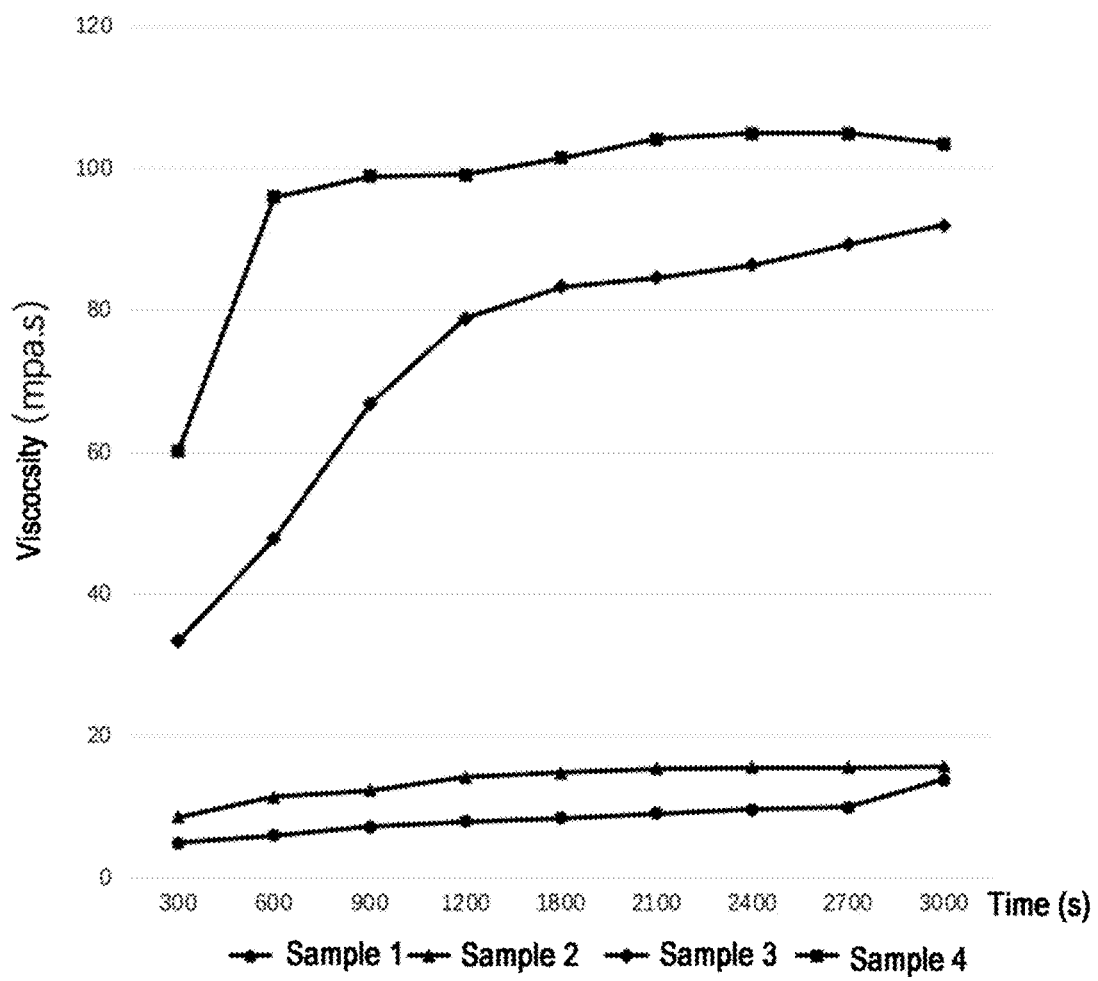
FIG. 2 shows a viscosity change of pectins with different solubility over time under the same conditions.

The results are shown in FIG. 2: in the solution system with pH=3, all the samples showed the trend of viscosity increasing as a function of time. Compared with the regular insoluble pectin, the viscosity of the instant pectin was higher at any time point. The viscosity of the two low-ester pectins combined with calcium was significantly higher than that of the simple pectin. The viscosity of the instant pectin+calcium salt reached high viscosity earlier and then increased slowly. The viscosity of the regular insoluble pectin+calcium salt increased relatively slowly. Overall, the viscosity of the regular insoluble pectin+calcium salt was lower than that of the instant pectin+calcium salt at any time point.

Example 2

The effect of instant and non-instant low-ester pectin powder on bread GI value was compared.

Example 1 has demonstrated that the viscosity of instant low-ester pectin combined with calcium is significantly higher than that of non-instant low-ester pectin. In this example, two low-ester pectin powders were used to formulate a formulated pectin powder for addition to bread.

The effect of the two powders on the GI value of bread and the area growth under the post-prandial blood glucose curve (IAUC) were observed.

The formulated pectin powder was prepared according to the procedure shown in FIG. 1, with the amount of active ingredient added as indicated in the samples.

Test Protocol:
1) In accordance with the guidance of "Method for Measuring Food Glycemic Index by Health Industry Standard of the People's Republic of China" WS/T 652-2019, 12 subjects (Table 2) meeting the inclusion-exclusion criteria are selected for blood glucose test (blood glucose of 10 min, 5 min before meal, 15 min, 30 min, 45 min, 60 min, 90 min and 120 min after meal), and the area growth under the curve (IAUC) and GI value of 2h after meal are obtained;

TABLE 2

| Subject Information | | | |
|---|---|---|---|
| | Gender | BMI (kg/m$^2$) | Age (yrs) |
| Subject 1 | Male | 22.5 | 30 |
| Subject 2 | Male | 19.6 | 29 |
| Subject 3 | Male | 23.9 | 25 |
| Subject 4 | Male | 20.8 | 26 |
| Subject 5 | Male | 21.5 | 21 |
| Subject 6 | Male | 22.8 | 27 |
| Subject 7 | Female | 18.9 | 28 |
| Subject 8 | Female | 20.6 | 29 |
| Subject 9 | Female | 22.9 | 32 |
| Subject 10 | Female | 20.3 | 26 |
| Subject 11 | Female | 19.8 | 30 |
| Subject 12 | Female | 21.0 | 23 |

Sample Preparation:

Sample 1: 428 parts of high gluten flour, 198 parts of purified water, 4 parts of salt, 43 parts of erythritol, 6 parts of dried yeast, 86 parts of milk, 75 parts of light cream, 110 parts of eggs, 33 parts of butter, and 18 parts of formulated pectin powder (14 parts of non-instant low-ester pectin powder, and 4 parts of calcium hydrogen phosphate).

Sample 2: 428 parts of high gluten flour, 198 parts of purified water, 4 parts of salt, 43 parts of erythritol, 6 parts of dried yeast, 86 parts of milk, 75 parts of light cream, 110 parts of eggs, 33 parts of butter, and 18 parts of formulated pectin powder (14 parts of instant low-ester pectin powder, and 4 parts of calcium hydrogen phosphate).

Figure 19:
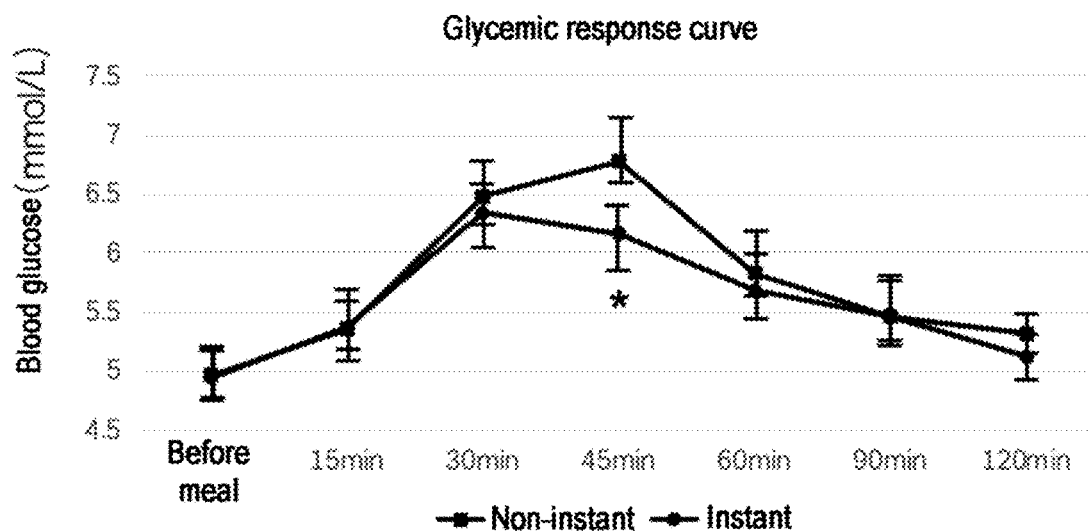
FIG. 19 exhibits the post-prandial glycemic response curve of formulated pectin powder European breads added with non-instant and instant pectins.
Figure 20:
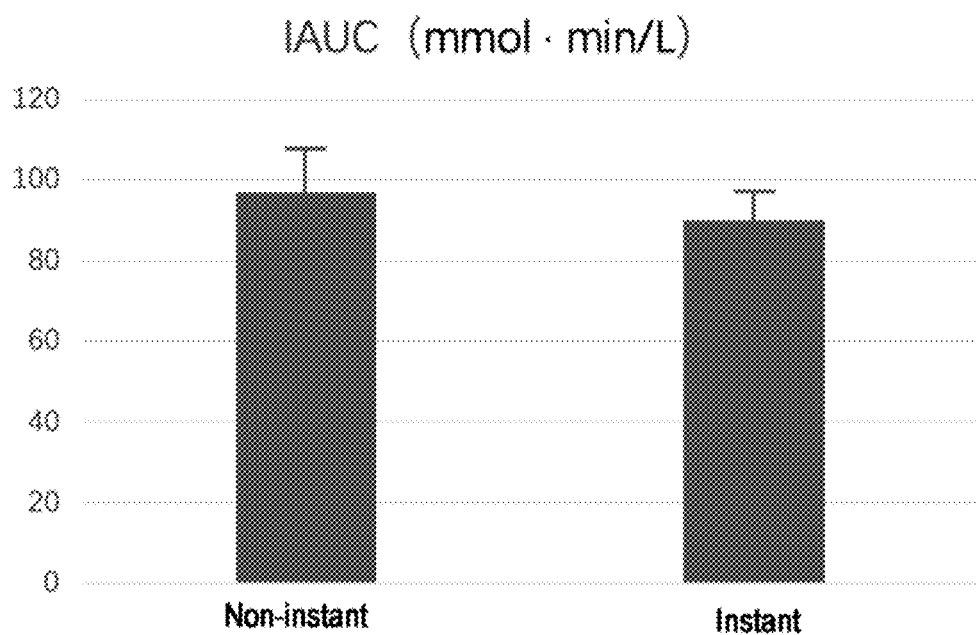
FIG. 20 shows the area growth under the postprandial blood glucose curve (IAUC) of formulated pectin powder European breads added with non-instant and instant pectins.

Results: 1) Postprandial glucose response curve (FIG. 19) and area growth under the glucose curve (IAUC, FIG. 20): the postprandial blood glucose response curve of formulated pectin powder with instant pectin was more stable than that of formulated pectin powder with non-instant pectin, and 45 min postprandial, blood glucose showed significant difference (P<0.05);

2) GI value: sample 1: 55, sample 2: 52; European bread could be improved as low GI food with the formulated pectin powders formulated with two low-ester pectins, and the effect of lowering the GI value of European bread was better by using formulated pectin pwders with instant low-ester pectin.

Note: in the following examples and comparative examples, instant low-ester pectins were used.

Example 3

Formulated pectin powder composed of different ratios of calcium salt and pectin are prepared, wherein the actual content ratios of calcium ion (mg) and low-ester pectin (g) were 30:1, 60:1, 90:1 and 120:1 (mg:g) (note: the actual content is calculated according to the net content of the product), which is applied to European bread to observe the blood glucose response after bread-taking and the effect on bread GI value; meanwhile, the sensory indexes of dough and bread were evaluated.

2) Dough water absorption, dough leavening height, bread-specific volume, bread moisture content, and bread hardness were determined for each sample, and the taste and mouthfeel were evaluated as well.

Subjects and protocols were as described in Example 2.

Sample Preparation:

Sample 1: regular European bread—458 parts of high gluten flour, 161 parts of purified water, 5 parts of salt, 46 parts of erythritol, 6 parts of dry yeast, 92 parts of milk, 80 parts of light cream, 118 parts of eggs, and 35 parts of butter.

Sample 2: 429 parts of high gluten flour, 198 parts of purified water, 4 parts of salt, 43 parts of erythritol, 6 parts of dry yeast, 87 parts of milk, 75 parts of light cream, 110 parts of eggs, 33 parts of butter, and 15 parts of formulated pectin powder (14 parts of low-ester pectin powder, and 1 part of calcium hydrogen phosphate)—the actual effective component ratio of calcium ion (mg) to pectin (g) is 30:1 (mg:g).

Sample 3: 429 parts of high gluten flour, 198 parts of purified water, 4 parts of salt, 43 parts of erythritol, 6 parts of dry yeast, 87 parts of milk, 75 parts of light cream, 110 parts of eggs, 33 parts of butter, and 16 parts of formulated pectin powder (14 parts of low-ester pectin powder, and 2 parts of calcium hydrogen phosphate)—the actual effective component ratio of calcium ion (mg) to pectin (g) is 60:1 (mg:g).

Sample 4: 428 parts of high gluten flour, 198 parts of purified water, 4 parts of salt, 43 parts of erythritol, 6 parts of dry yeast, 86 parts of milk, 75 parts of light cream, 110 parts of eggs, 33 parts of butter, and 17 parts of formulated pectin powder (14 parts of low-ester pectin powder, and 3 parts of calcium hydrogen phosphate)—the actual effective component ratio of calcium ion (mg) to pectin (g) is 90:1 (mg:g).

Sample 5: 428 parts of high gluten flour, 198 parts of purified water, 4 parts of salt, 43 parts of erythritol, 6 parts of dry yeast, 86 parts of milk, 75 parts of light cream, 110 parts of egg, 33 parts of butter, and 18 parts of formulated pectin powder (14 parts of low-ester pectin powder, and 4 parts of calcium hydrogen phosphate)—the actual effective component ratio of calcium ion (mg) to pectin (g) is 120:1 (mg:g).

The Manufacturing Steps were as Follows:

High gluten flour, salt, erythritol, dry yeast, and formulated pectin powder were mixed together. Water, milk, light cream, and melted butter were added to the evenly mixed dry material and stirred until the dough became gluten.

The dough was allowed to stand at room temperature and covered with a damp cloth. After 20 minutes of relaxation, the dough was removed and divided into small doughs containing 25 g of carbohydrates (about 148 g).

After rounding, the dough was proofed in a proofing cabinet at a humidity of 70-75% and a temperature of 26-28° C. for 30 minutes and then removed for shaping.

After shaping, the dough was again placed in a proofing box in the above environment for a second proofing.

The oven was preheated at 180° C. for 5 minutes. When the raw bread is 1.5 times the size after shaping, the raw bread was placed in the oven for baking at 180° C. for 20 minutes. The bread is ready to be baked.

Figure 3:
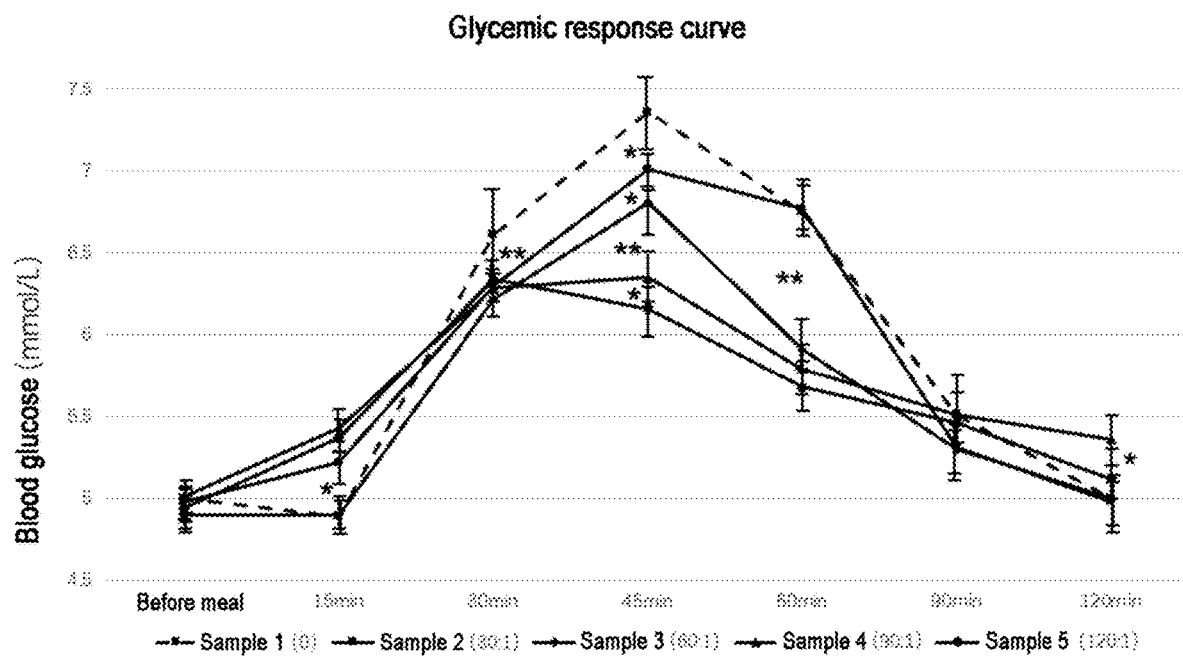
FIG. 3 shows the results of the effect of adding different calcium salt/pectin mass ratios of the formulated pectin powder on the blood glucose response curve after a European bread meal; * in the FIG. 3, * indicates p<0.05, and ** indicates p<0.01, and the same below.
Figure 4:
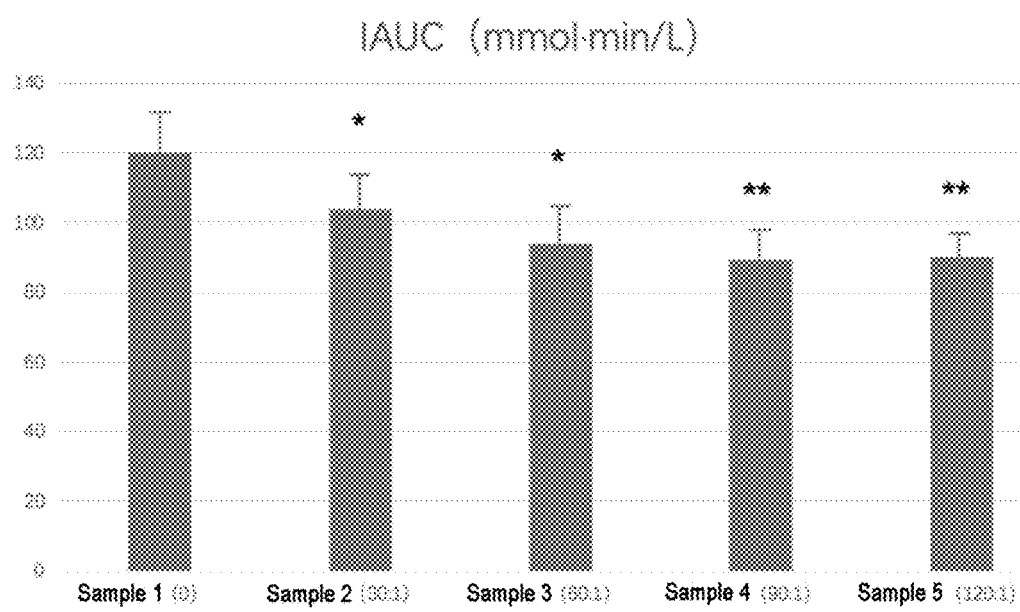
FIG. 4 shows the area growth under the postprandial glucose response curve (IAUC) of European breads added with the formulated pectin powder at different calcium salt/pectin mass ratios.

Results:
1) The glycemic response curve and the growth under the glycemic response curve (IAUC) are shown in FIGS. 3 and 4: actual calcium ion/pectin ratio (mg:g) of formulated pectin added with low-ester pectin and calcium salt under 30-120:1, compared with the European bread without pectin, was effective in reducing the blood glucose response, especially 30 min, 45 min, and 60 min after meal, the significant difference occurred (p<0.05), and effective in reducing the growth under the blood glucose response curve (IAUC) (p<0.05). The best effect was obtained when the actual calcium/pectin ratio (mg:g) was 90-120:1, and the IAUC was significantly lower than that of 30:1 (p<0.05);
2) Sample GI value results: Sample 1: 74; Sample 2: 62; Sample 3: 55; Sample 4: 52; Sample 5: 52. When the calcium/pectin ratio (mg:g) was 30-120:1, the GI value of European bread can be effectively reduced to that of medium/low GI food, and when the ratio was 90-120:1, the GI value is the lowest.
3) Dough and bread shape: the fermentation height, water absorption, specific volume, and moisture content of the dough with formulated pectin powder were significantly higher than those without pectin powder (p<0.05), and the hardness was significantly lower than that without pectin powder (p<0.05) at day 10. Bread-specific volumes of the formulated pectin powder with actual calcium salt to pectin ratio (mg:g) 60-120:1 was significantly greater than those with a 30:1 ratio (p<0.05). The results are shown in Table 3.
4) According to the questionnaire survey, no gastrointestinal symptoms such as abdominal distension, diarrhea, nausea, abdominal pain, and increased exhaust were found in 12 subjects who consumed the samples. Subjective evaluation by taste evaluators: the European bread with formulated pectin powder had a softer, elastic and odorless taste than that without formulated pectin powder.

Conclusion: 1) The addition of formulated pectin powder with appropriate calcium ion pectin ratio can effectively reduce the GI value of regular non-added sugar European bread and make postprandial blood glucose of the subjects more stable.
2) The bread added with formulated pectin powder had better puffiness, taste, and acceptance.

The formulated pectin powder was prepared according to the procedure shown in FIG. 1, with the amount of active ingredient added as indicated in the samples.

The protocol and subject information were the same as in Example 2.

Sample 1: regular European bread—458 parts of high gluten flour, 161 parts of purified water, 5 parts of salt, 46 parts of erythritol, 6 parts of dry yeast, 92 parts of milk, 80 parts of light cream, 118 parts of eggs, and 35 parts of butter.

Sample 2: formulated pectin powder containing only pectin and calcium ions was added—422 parts of high gluten flour, 194 parts of purified water, 4 parts of salt, 42 parts of erythritol, 6 parts of dried yeast, 85 parts of milk, 75 parts of light cream, 109 parts of egg, 32 parts of butter, and 30 parts of formulated pectin powder (24 parts of low-ester pectin powder, and 6 parts of calcium hydrogen phosphate powder).

Sample 3: formulated pectin powder containing only pectin, calcium ions and guar gum was added—396 parts of high gluten flour, 222 parts of purified water, 4 parts of salt, 40 parts of erythritol, 6 parts of dried yeast, 83 parts of milk, 73 parts of light cream, 106 parts of egg, 31 parts of butter, and 38 parts of formulated pectin powder (24 parts of low-ester pectin powder, 6 parts of calcium hydrogen phosphate powder, and 8 parts of guar gum powder).

Sample 4: formulated pectin powder containing only pectin, calcium ions, and arabinoxylan (AX powder) was added—417 parts of high gluten flour, 192 parts of purified water, 4 parts of salt, 42 parts of erythritol, 6 parts of dried yeast, 84 parts of milk, 74 parts of light cream, 108 parts of eggs, 32 parts of butter, and 40 parts of formulated pectin powder (23 parts of low-ester pectin powder, 6 parts of calcium hydrogen phosphate powder, and 11 parts of AX powder).

Sample 5: formulated pectin powder containing pectin, calcium ions, guar gum, and arabinoxylan (AX powder) was added—392 parts of high gluten flour, 220 parts of purified water, 4 parts of salt, 40 parts of erythritol, 6 parts of dried yeast, 82 parts of milk, 72 parts of light cream, 105 parts of egg, 30 parts of butter, and 48 parts of formulated pectin powder (23 parts of low-ester pectin powder, 6 parts of

TABLE 3

Test results of sample properties

| Sample | Dough height (cm) | Dough Water Absorption (%) | Bread specific volume (mL/g) | Bread moisture content (%) | Day 0 Hardness (g) | Day 10 Hardness (g) |
|---|---|---|---|---|---|---|
| 1 | 5.21 ± 0.4 | 59.2 ± 3.3 | 5.2 ± 0.8 | 30 ± 3.2 | 158 ± 7.8 | 1350 ± 27 |
| 2 | 6.83 ± 0.33* | 64.4 ± 4.66* | 5.54 ± 0.7* | 38 ± 2.6* | 159 ± 5.6 | 1156 ± 24* |
| 3 | 7.45 ± 0.35* | 66.4 ± 4.53* | 5.88 ± 0.6** | 43 ± 2.8* | 149 ± 7.6 | 1201 ± 19* |
| 4 | 7.57 ± 0.46* | 65.8 ± 5.78* | 5.79 ± 0.6** | 48 ± 3.1* | 152 ± 6.9 | 1117 ± 22* |
| 5 | 7.66 ± 0.25* | 67.2 ± 5.21* | 5.92 ± 0.4** | 45 ± 3.3* | 155 ± 9.7 | 1134 ± 22* |

Example 4

The formulated pectin compositions with different compositions were applied to European bread with no sugar added and compared to European bread with regular pectin without sugar. The postprandial blood glucose response and the effect to GI values of several European breads were compared. Meanwhile, the degree of bread puffiness, moisture content, and other sensory indicators were also evaluated.

calcium hydrogen phosphate powder, 8 parts of guar gum powder, and 11 parts of AX powder).

The preparation procedure was shown in Example 2.

Figure 5:
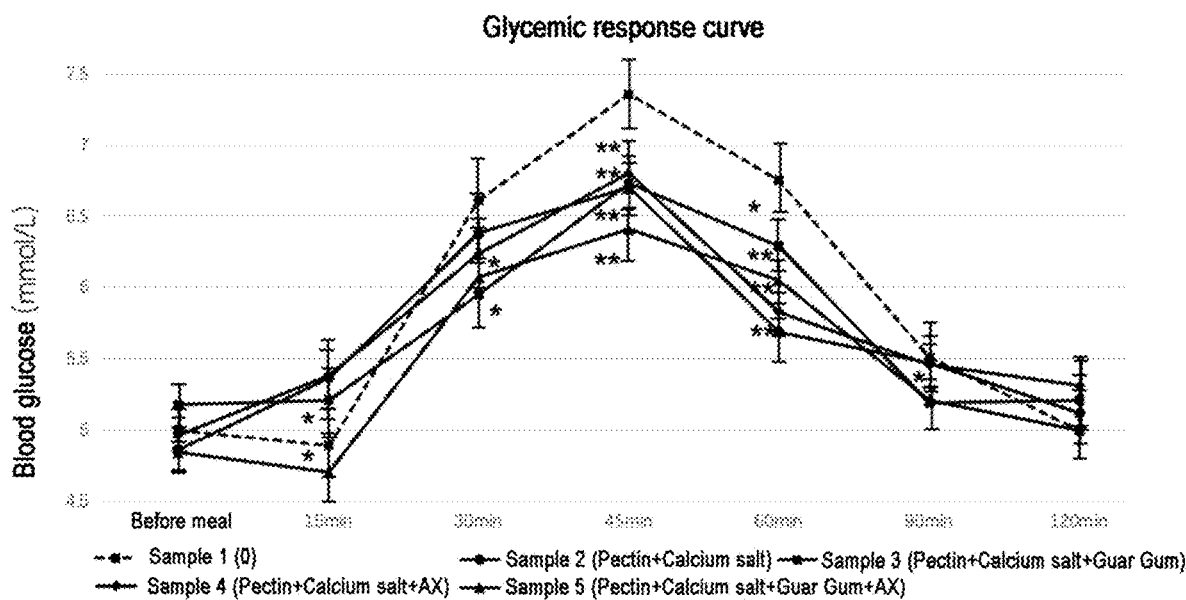
FIG. 5 exhibits the effect results of addition of formulated pectin powder containing different compositions on the blood glucose response curve after a European bakery meal.
Figure 6:
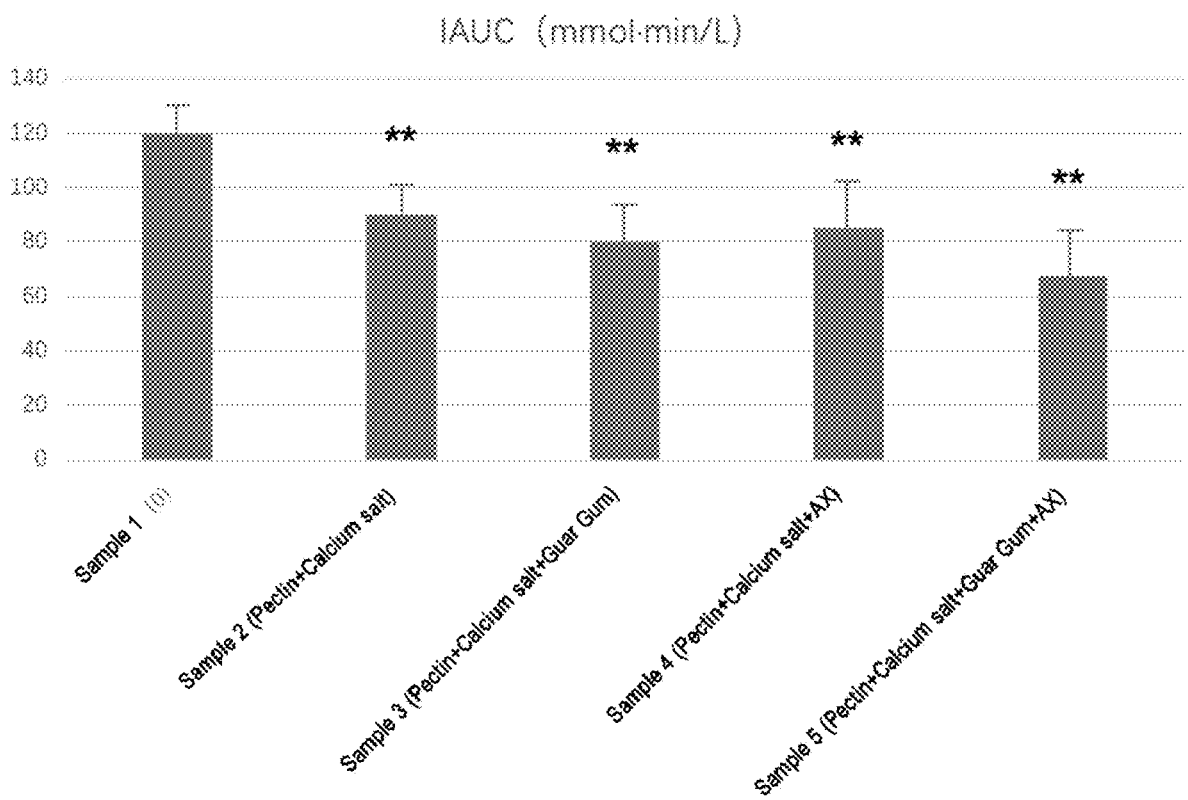
FIG. 6 shows the area growth under the postprandial blood glucose response curve (IAUC) for addition of European breads containing formulated pectin powders of different compositions.

Results: 1) The blood glucose response curve and IAUC profile are shown in FIG. 5 and FIG. 6: the blood glucose response curve of bread added with formulated pectin powder was more stable than that without formulated pectin powder (p<0.05); the difference was especially significant at 30 min, 45 min and 60 min after meal. The IAUC of bread added with formulated pectin powder was significantly less than that of regular bread without formulated pectin powder (p<0.05). The IAUC value of bread with guar gum formulated pectin powder (Sample 3) was significantly lower than those of Sample 2 with only calcium salt and pectin (p<0.05). The IAUC value of the bread with AX formulated pectin powder (Sample 4) was lower than that of the bread with calcium salt and pectin only (Sample 2) and the difference has no statistical significance (p>0.05). The IAUC value for Sample 5 containing the low-ester pectin, calcium salt, guar gum, and AX was significantly lower than for Sample 2 (p<0.05).

2) GI value: Sample 1: 74, Sample 2: 52, Sample 3: 48, Sample 4: 50, Sample 5: 45, Samples 2-5 with added formulated pectin powder have significantly lower GI values than Sample 1 without formulated pectin powder, and all are low GI food.

3) Dough and bread shape: the fermentation height, water absorption, specific volume, and moisture content of the dough with formulated pectin powder were significantly higher than those without pectin powder (p<0.05). The hardness was significantly lower than that without pectin powder (p<0.05). The dough water uptake and bread specific volume of Sample 3 with guar and Sample 5 with guar+AX were significantly higher than Sample 2 and Sample 4 (p<0.05). The results are shown in Table 4.

4) According to the questionnaire survey, no gastrointestinal symptoms such as abdominal distension, diarrhea, nausea, abdominal pain, and increased exhaust were found in 12 subjects who consumed the samples. Subjective evaluation by taste evaluators: the European breads with formulated pectin powder had a softer, elastic and odorless taste than that without formulated pectin powder.

Conclusion: 1) The addition of formulated pectin powder containing low-ester pectin and calcium salt can effectively reduce the GI of regular European bread without sugar added.

2) On this basis, the formulated pectin powder only increased guar gum, which could further improve the blood glucose response curve and reduce the GI value. The effect trend of increasing AX only on blood glucose response and bread GI was better than that of the formulated pectin powder containing low-ester pectin and calcium salt. The formulated pectin powder containing low-ester pectin, calcium salt, guar gum and AX applied in bread could further reduce postprandial blood glucose response and the GI value of bread due to its synergistic effect.

3) The bread added with formulated pectin powder had better bulkiness, taste, and acceptance. Guar gum could further increase the bulkiness and moisture content of bread, which had an important role in improving the sensory quality.

Example 5

The formulated pectin powder was applied to European bread, and the effect of various contents of formulated pectin powder (2%, 4%, 6%, and 8%) on bread GI was compared.

The content of the formulated pectin powder in the finished bread was determined by the amount of formulated pectin powder added to each sample before preparation after measuring the water loss rate by the pre-baking assay, so as to ensure the content of the formulated pectin composition in the finished bread.

Formulated pectin powder was prepared according to the process shown in FIG. 1, wherein the formulation of the formulated pectin powder was as follows: low-ester pectin powder 48 wt %, guar gum 17 wt %, arabinoxylan 23 wt %, and dibasic calcium phosphate 12 wt %.

Sample 1 (0% addition) formulation: 458 parts of high gluten flour, 161 parts of purified water, 5 parts of salt, 46 parts of erythritol, 6 parts of dried yeast, 92 parts of milk, 80 parts of light cream, 118 parts of eggs, and 35 parts of butter.

Sample 2 (2% addition) formulation: 427 parts of high gluten flour, 196 parts of purified water, 4 parts of salt, 43 parts of erythritol, 6 parts of dried yeast, 86 parts of milk, 75 parts of light cream, 111 parts of eggs, 32 parts of butter and 18 parts of formulated pectin powder.

Sample 3 (4% addition) formulation: 419 parts of high gluten flour, 193 parts of purified water, 4 parts of salt, 42 parts of erythritol, 6 parts of dried yeast, 85 parts of milk, 75 parts of light cream, 109 parts of eggs, 32 parts of butter and 36 parts of formulated pectin powder.

Sample 4 (6% addition) formulation: 412 parts of high gluten flour, 189 parts of purified water, 4 parts of salt, 41 parts of erythritol, 6 parts of dried yeast, 83 parts of milk, 73 parts of light cream, 107 parts of eggs, 31 parts of butter and 53 parts of formulated pectin powder.

Sample 5 (8% addition) formulation: 405 parts of high gluten flour, 186 parts of purified water, 4 parts of salt, 40 parts of erythritol, 6 parts of dried yeast, 82 parts of milk, 72 parts of light cream, 105 parts of eggs, 30 parts of butter and 70 parts of formulated pectin powder.

The preparation procedure was as described in Example 2.

Figure 7:
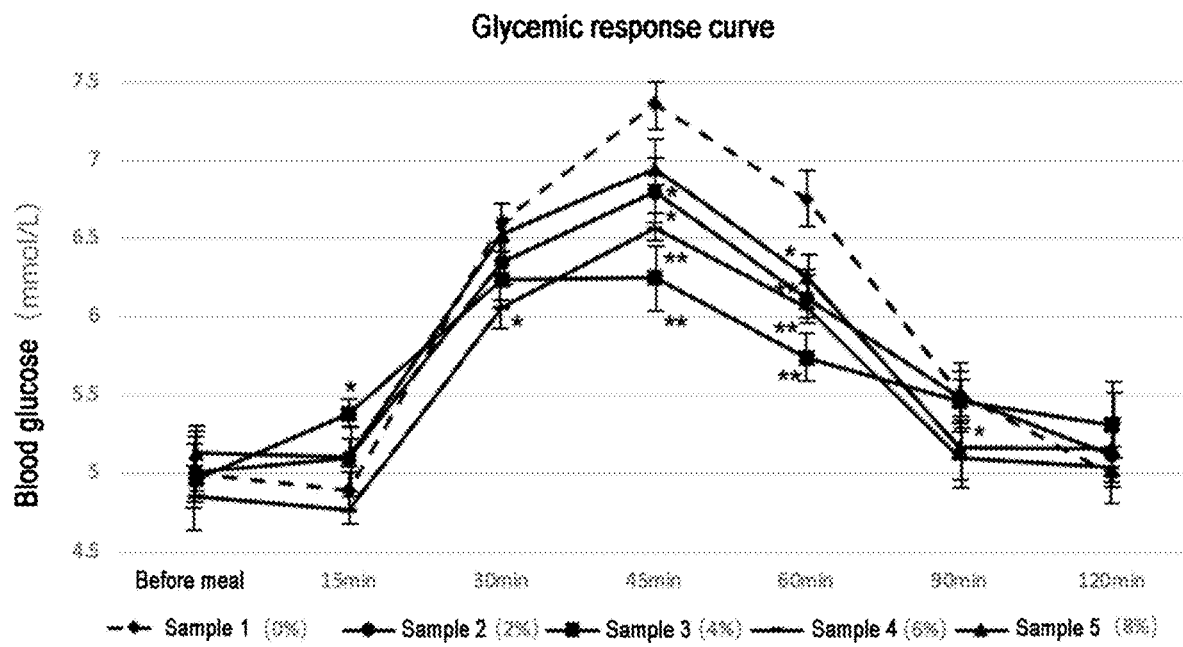
FIG. 7 shows the effect results of adding different levels of formulated pectin powder on the blood glucose response curve after a European bread meal.

The Above Samples were Subjected to Population GI Value Test with Results:

1) The blood glucose response curve is shown in FIG. 7: the postprandial blood glucose response of the bread with added formulated pectin powder was smoother than that of the bread without formulated pectin powder. After 30 minutes, the blood glucose response for the bread with formulated pectin powder was significantly lower than that without formulated pectin powder. The increase of formulated pectin powder added

TABLE 4

Test results of sample properties

| Sample | Dough height (cm) | Dough Water Absorption (%) | Bread specific volume (mL/g) | Bread moisture content (%) | Day 0 Hardness (g) | Day 10 Hardness (g) |
|---|---|---|---|---|---|---|
| 1 | 5.21 ± 0.4 | 59.2 ± 3.3 | 5.2 ± 0.8 | 30 ± 3.2 | 158 ± 7.8 | 1350 ± 27 |
| 2 | 7.61 ± 0.44[1] | 66.6 ± 5.34[1] | 5.81 ± 0.5[1] | 47 ± 3.2[1] | 154 ± 7 | 1134 ± 22[1] |
| 3 | 8.02 ± 0.33[1] | 72.3 ± 5.55[12] | 6.34 ± 0.7[12] | 49 ± 3.1[1] | 148 ± 6.6 | 1098 ± 20[1] |
| 4 | 7.59 ± 0.39[1] | 67.4 ± 6.21[1] | 5.81 ± 0.5[1] | 47 ± 2.9[1] | 151 ± 7.1 | 1122 ± 23[1] |
| 5 | 8.04 ± 0.27[1] | 73.2 ± 5.96[12] | 6.42 ± 0.4[12] | 50 ± 2.8[1] | 149 ± 6.8 | 1124 ± 30[1] |

[1]Significant difference compared to Sample 1 (p < 0.05)
[2]Significant difference compared to Sample 2 (p < 0.05)

made the effect more prominent. There was no significant difference in the postprandial blood glucose rise between the bread with 6% and 8% formulated pectin powder (p>0.05).

Figure 8:
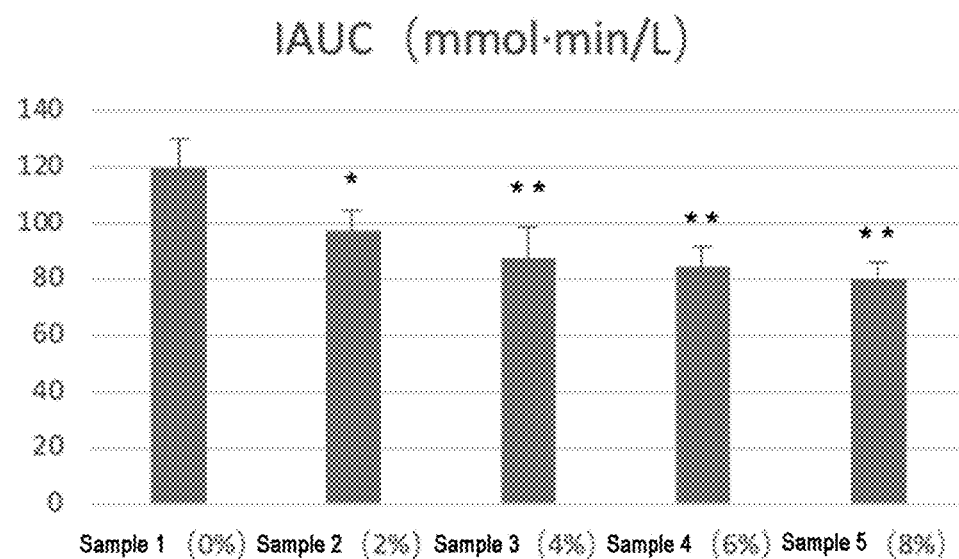
FIG. 8 exhibits the area growth under the curve of postprandial blood glucose response (IAUC) of European breads supplemented with different levels of formulated pectin powder.

2) The IAUC is shown in FIG. 8: compared with glucose and normal sugar-free bread without pectin powder, the IAUC value of 2%-8% pectin composition decreased significantly (p<0.05), and the GI-lowering effect of 6% and 8% pectin compositions was significantly better than that of 2% bread (p<0.05).

3) The GI values for the five samples were measured as follows: Sample 1: 74; Sample 2: 62; Sample 3: 54; Sample 4: 51; Sample 5: 51; 4% formulated pectin composition could prepare normal sugar-free European bread into low GI food. The GI values of 6%-8% formulated pectin composition were consistent. Compared with normal sugar-free European bread, the reduction rate of GI value reached 31.1%.

Under the baking condition of 180° C. and 20 minutes, the GI value of regular sugar-free European bread could be reduced effectively by adding 2%-8% formulated pectin, and the highest reduction rate could reach 37.8%. The content of 4-8% could lower the high-GI regular sugar-free European bread with GI value of 74 to low-GI European bread. Secondly, the added amount of all the materials met the national safety standards; meanwhile, 12 subjects who consumed the samples did not have the gastrointestinal tract conditions such as abdominal distension, diarrhea, nausea, abdominal pain, or increased exhaust according to the questionnaire survey. The bread was highly acceptable and evaluated for odor, appearance, sweetness, luster, and chewiness.

Example 6

The glucose response and GI value after meal were observed when the formulated pectin powder with different AX addition ratios was applied to European breads without added sugar. The ratio of the actual content of low-ester pectin to that of AX (converted from net content) was 3:1, 2:1, and 1:1.

The test subjects, blood glucose test protocol, and procedures were shown in Example 2; the formulated pectin powder was formulated as shown in FIG. 1, and the formulations were as the Samples.

Formulation of Sample 1 (3:1): 423 parts of high gluten flour, 194 parts of purified water, 4 parts of salt, 40 parts of erythritol, 6 parts of dried yeast, 85 parts of milk, 74 parts of light cream, 108 parts of eggs, 22 parts of butter, and 43 parts of formulated pectin powder (23.3 parts of low-ester pectin powder, 8.3 parts of guar gum powder, 5.5 parts of AX powder, and 5.9 parts of calcium hydrogen phosphate powder).

Formulation of Sample 2 (2:1): 422 parts of high gluten flour, 193 parts of purified water, 4 parts of salt, 40 parts of erythritol, 6 parts of dried yeast, 85 parts of milk, 74 parts of light cream, 108 parts of eggs, 22 parts of butter, and 45 parts of formulated pectin powder (23 parts of low-ester pectin powder, 8.2 parts of guar gum powder, 8.1 parts of AX powder, and 5.8 parts of calcium hydrogen phosphate powder).

Formulation of Sample 3 (1:1): 418 parts of high gluten flour, 192 parts of purified water, 4 parts of salt, 40 parts of erythritol, 6 parts of dried yeast, 84 parts of milk, 73 parts of light cream, 107 parts of eggs, 22 parts of butter, and 53 parts of formulated pectin powder (23 parts of low-ester pectin powder, 8.2 parts of guar gum powder, 16 parts of AX powder, and 5.8 parts of calcium hydrogen phosphate powder).

The preparation procedure was shown in Example 2.

Figure 9:
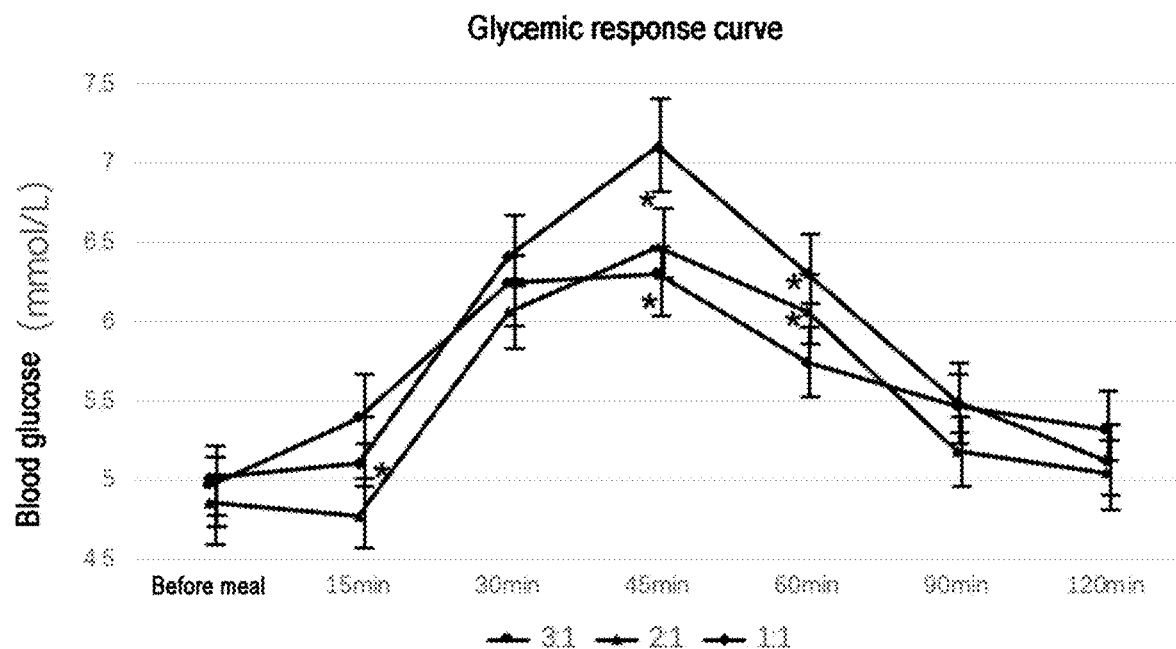
FIG. 9 shows the effect results of formulated pectin powder with different AX ratios on the blood glucose response curve after a European bread meal.
Figure 10:
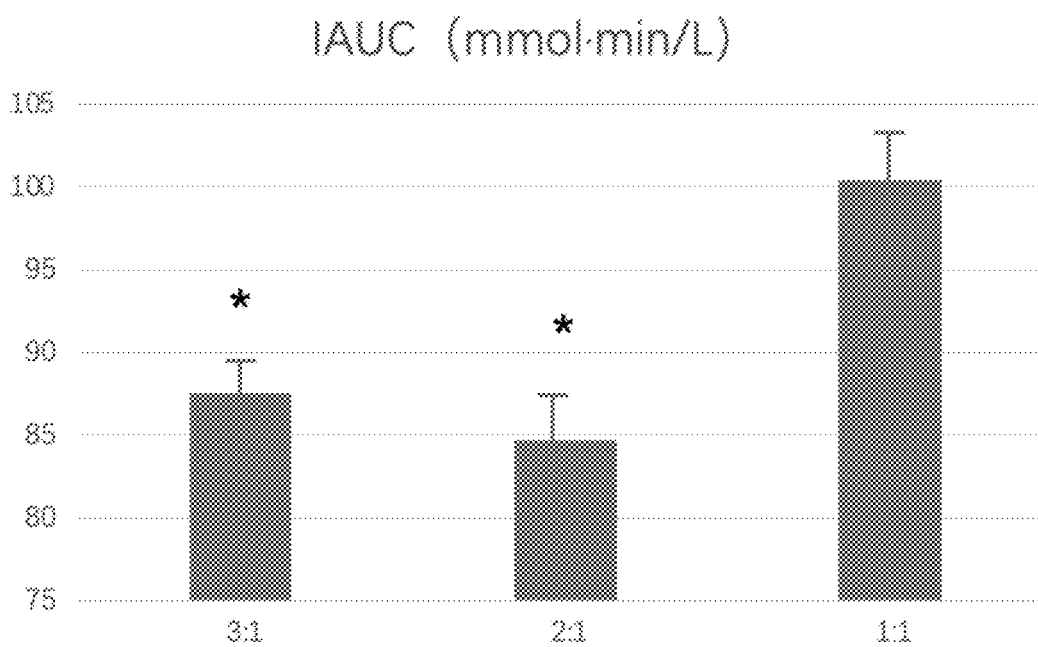
FIG. 10 shows the area growth under the post-prandial blood glucose response curve (IAUC) for European bread with different AX ratios.

Results: 1) Glucose response curves (FIG. 9) and IAUC (FIG. 10): in the formulated pectin technology, low-ester pectin/AX ratio in the case of 3-1:1 can reduce the blood glucose response of European bread to some extent (compared with the regular European bread in the above-mentioned examples), wherein the IAUC in the ratio of 2:1 and 3:1 is significantly lower than that in the sample with the ratio of 1:1 (p<0.05), and both can improve the regular European bread without added sugar with a high GI into low GI food, and the effect is the best when the ratio is 2:1.

2) GI values of Samples: sample 1: 54; sample 2: 51; sample 3: 62.

When the ratio of low-ester pectin to AX is 1-3:1, the complex cross-linking reaction of low-ester pectin to AX can significantly reduce the GI, and the effect is the best when the ratio is 2:1. Similarly, none of the 12 subjects had abdominal distension, diarrhea, abdominal pain, nausea and vomiting, or increased exhaust after the sample taking.

Example 7

The cakes with formulated pectin composition (Test Group) and without formulated pectin composition (Control Group) were prepared, and the effects of formulated pectin on cake GI and the blood glucose response after two kinds of cake taking were observed.

The test subjects, blood glucose test protocol, and procedures were shown in Example 2.

Sample Information:

The contents of each raw material component in the Control Group were as follows: 517 parts of eggs, 207 parts of milk, 69 parts of white granulated sugar and 207 parts of low gluten flour.

The contents of each raw material component in the Test Group were as follows: 492 parts of eggs, 197 parts of milk, 66 parts of white granulated sugar, 197 parts of low gluten flour and 48 parts of formulated pectin.

Wherein the proportion of the formulated pectin powder was as follows: low-ester pectin powder 51.1 wt %, guar powder 18.2 wt %, arabinoxylan powder 17.9 wt %, and calcium hydrogen phosphate 12.9 wt %.

The Manufacturing Steps were as Follows:

Low gluten flour was weighed and mixed with the formulated pectin powder into a mixed dry material for use.

The egg albumen was separated from the yolk for use. The egg yolk and milk were stirred uniformly, poured into the mixed dry material which is mixed uniformly, and stirred into a batter for use.

White sugar and erythritol were added to the egg albumen in three portions for whipping. The whipping was stopped until dry foaming.

1/3 of the whipped egg albumen was taken and stirred with the batter to fusion.

The well-fused batter was mixed into the remaining egg albumen and stirred again until uniformity to obtain a cake paste.

The oven was preheated at 120° C. for 5 minutes. The cake paste was dispensed into the cake mold, and excess air was removed by gently shaking the plate. The mold was put into the preheated oven, and baked at 120° C. for 25 minutes.

After 25 minutes, the oven temperature was adjusted to 150° C., the cake was continued baking for 25 minutes and taken out.

The baked cake was fluffy and dense with an egg aroma. No unpleasant taste.

Figure 11:
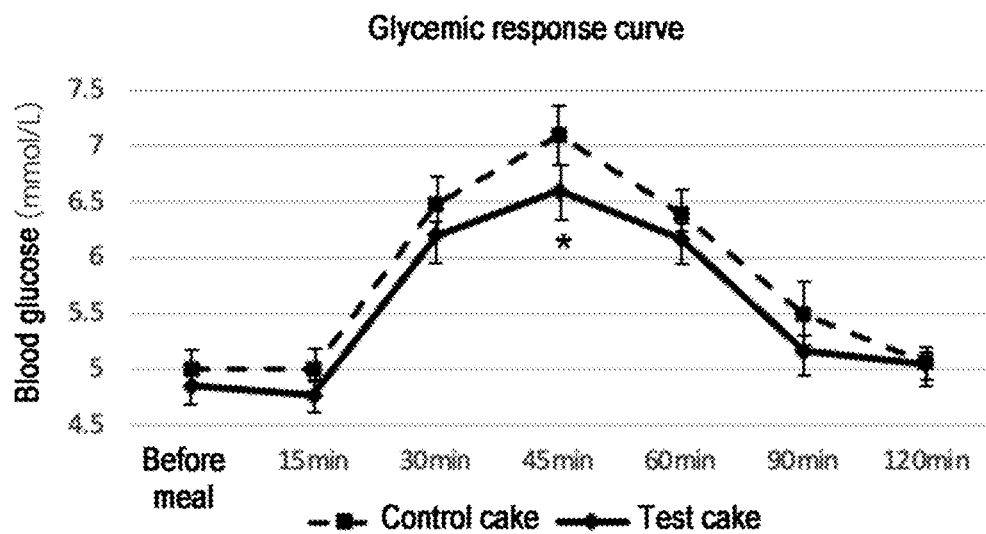
FIG. 11 illustrates the effect results on the blood glucose response curve of cakes with or without formulated pectin powder.
Figure 12:
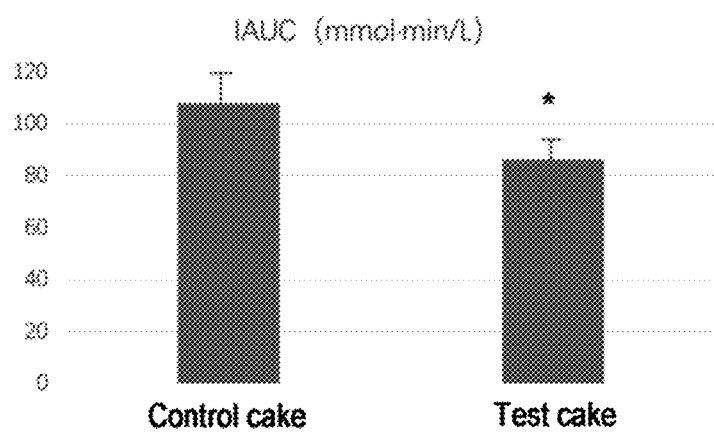
FIG. 12 shows the area growth under the postprandial blood glucose response curve (IAUC) of cakes with or without formulated pectin powder.

Results: 1) Glycemic response (FIG. 11) and area growth under the curve (FIG. 12): The peak of blood glucose response at 45 minutes after meal was significantly different between the two groups (p<0.05), and the blood glucose response after the meal of the cake with formulated pectin technology was lower than that without formulated pectin. There was also a significant difference in IAUC between the two groups, and the cake with formulated pectin had significantly lower IAUC than the cake without formulated pectin (p<0.05).

2) The GI of the Control cake was 68 and the GI of the Test cake was 52, relative to a decrease of 23.5%.

The formulated pectin powder applied to cakes can reduce the medium GI value of cake to low GI by 23.5%. Secondly, the addition of formulated pectin powder had little effect on the cake-making process. A questionnaire survey was also conducted on 12 subjects, and none had abdominal distension, diarrhea, nausea, abdominal pain, or increased exhaust, etc. The acceptance of the cake was high, and the cake was evaluated for its smell, appearance, sweetness, and suitability, with strong egg aroma, softness, and denseness.

Example 8

The formulated pectin powder was applied to noodles.

The contents of each raw material component were as follows: 682 parts of medium gluten flour, 192 parts of water, 1.4 parts of salt, 70 parts of eggs and 60 parts of formulated pectin powder.

Wherein the proportion of formulated pectin was as follows: low-ester pectin powder 64.3 wt %, guar powder 20.2 wt %, and calcium hydrogen phosphate 15.5 wt %.

The Manufacturing Steps were as Follows:

The formulated pectin powder was weighed and mixed with medium gluten flour to obtain a premixed dry material.

Water, eggs, and salt were mixed until all the salt was melted to obtain a premixed wet material.

The dry ingredients were stirred with the wet ingredients until the dough surface was smooth.

The dough was covered with plastic wrap and allowed to relax for 15 minutes.

The relaxed dough was rolled into a rectangle or oval shape and pressed 3-5 times with a dough press until the dough sheet has a thickness of about 3 mm.

The pressed dough sheet was cut into 3 mm wide noodles using a cutting machine.

The prepared noodles can be frozen in a refrigerator or air dried and stored at room temperature and could be cooked directly for meal. The noodles were smooth and strong without bad taste and mouthfeel and would not lead to greasy soup while being cooked.

The noodle GI value measured according to the method in Example 2 was 58, compared to the regular noodle with a GI value of around 82 (data source: Yuexin Yang, Hongmei Cui, Yan Wang, Shixue Xiang, Lianda Yu, and Shuiying Zhou. Glycemic Index of Common Cereals and Potatoes [J]. Journal of Nutrition, 2003, (Issue 2).), was lowered 33%. If it was then slightly adjusted for the proportion of protein or coarse cereals in the noodles, there might be great potential to be low GI food.

Example 9

The formulated pectin was applied to cookies.

The contents of each raw material component were as follows: 387 parts of low gluten flour, 174 parts of milk, 4 parts of salt, 77 parts of white granulated sugar, 309 parts of butter and 48 parts of formulated pectin.

Wherein the proportion of formulated pectin was as follows: low-ester pectin 51 wt %, guar 14.5 wt %, arabinoxylan 22.3 wt %, and calcium hydrogen phosphate 12.2 wt %.

The Preparation Procedure was as Follows:

The butter was softened in advance, and the low-gluten powder, salt, and formulated pectin were stirred together until uniformity.

White sugar was added to the milk, heated in a waterproof manner until the white sugar was completely melted, and then cooled.

The electric eggbeater was turned on at a low speed, and the butter was whipped until there was no grain feel.

The cooled milk white sugar liquid were added to the whipped butter in 4-5 times, and each time the milk white sugar liquid were added, it must be fully fused with the butter.

The well-mixed dry materials were sieved and added to a well-whipped buttermilk, and mixed uniformly with a press-mixing method until there was no dry powder to obtain a cookie-dry batter.

The cookie dry batter was placed into a piping bag and extruded evenly into a baking tray.

The oven was preheated at 160° C.h for 10 minutes, the extruded cookie dry paste was placed in and baked for 20 minutes to obtain the cookie.

The toasted biscuit was crispy and tended to residue, with no bad taste.

Upon GI test analysis, the GI value of the biscuit was evaluated as 51, indicating low GI food.

Example 10

The formulated pectin powder containing low-ester pectin and ferric pyrophosphate (ferric iron) was applied to mouse feed to observe the postprandial glycemic response of mice after feeding, and compared with that of mice fed without formulated pectin powder.

Control Feed Ingredients: 70 parts of corn starch, 10 parts of corn oil, 5 parts of sucrose, and 15 parts of soybean meal;

Test Group 1 Feed Ingredients: 65 parts of corn starch, 10 parts of corn oil, 4 parts of sucrose, 15 parts of soybean meal, and 6 parts of low-ester pectin powder.

Test Group 2 Feed Ingredients: 64 parts of corn starch, 10 parts of corn oil, 4 parts of sucrose, 15 parts of soybean meal, and 7 parts of formulated pectin powder (6 parts of low-ester pectin powder, and 1 part of ferric pyrophosphate).

The formulation of the formulated pectin powder was shown in FIG. 1.

The Feed Preparation Method was as Follows:

The above-mentioned raw materials were put into a blender to be uniformly stirred, and then taken out and put into a hard granulator to prepare the feed with a size of 1 g/granule.

The test procedure was as follows: 3 groups of mice (6 mice in each group) were fed with the same feed for two days and then fasted for 5 hours to start the test. The mice in the three groups were fed with the same amount. Blood samples before meal, 15 min, 30 min, 60 min, 90 min, and 120 min after meal were collected to detect the blood glucose value.

Figure 13:
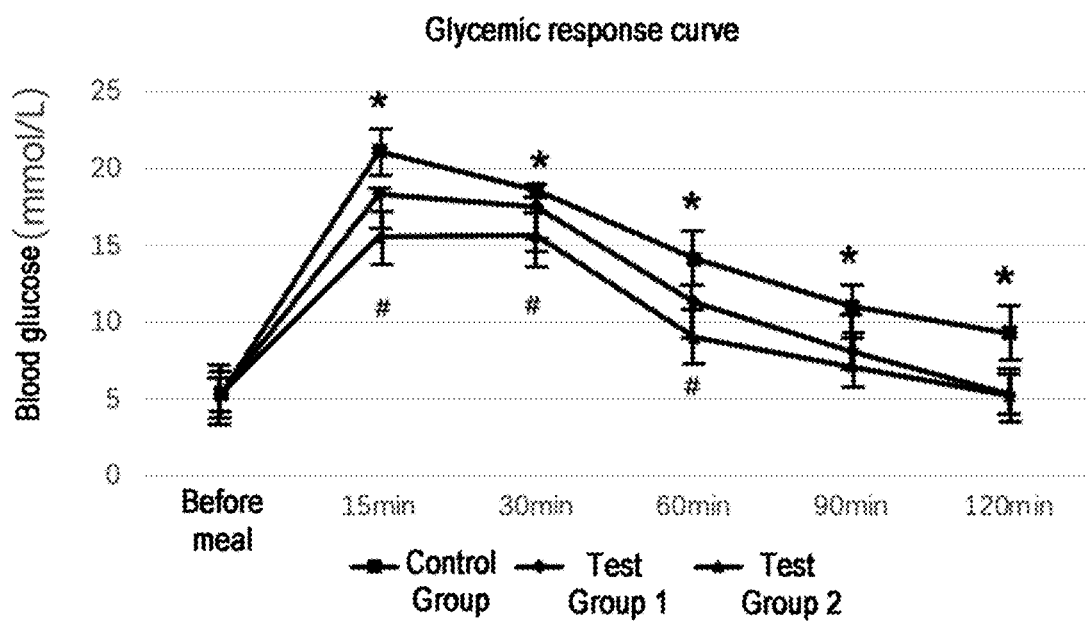
FIG. 13 shows the blood glucose response curve of the formulated pectin powder containing low-ester pectin and ferric pyrophosphate (ferric ions) applied to mouse feed. * The difference between Test Group 1, Test Group 2 and the Control Group was statistically significant (p<0.05). # The difference of Test Group 2 compared with Test Group 1 was statistically significant (p<0.05)
Figure 14:
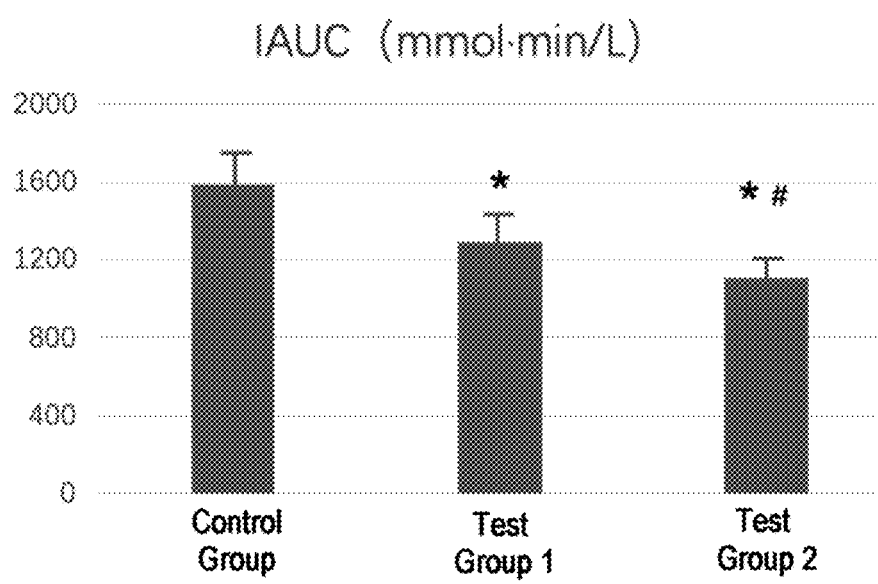
FIG. 14 shows the area growth under the blood glucose response curve (IAUC) for the formulated pectin powder containing low-ester pectin and ferric pyrophosphate (ferric iron) applied to mouse feed.

The results are shown in FIGS. 13 and 14: the blood glucose response curves of Test Groups 1 and 2 were more stable than that of the Control Group, and the difference was statistically significant (p<0.05). The blood glucose at 15, 30, and 60 minutes after meal of Test Group 2 was significantly different from that of Test Group 1. The blood glucose IAUC test of Test Group 2 was significantly lower than those of Test Group 1 and Control Group (p<0.05).

Conclusion: the combination of low-ester pectin and ferric iron used in mouse feed can effectively reduce the postprandial blood glucose response of mice.

Comparative Example 1

The Control and Test Groups were set. Test Group took the sugar-free European bread containing pectin+calcium salt, and Control Group took the same amount of European bread containing low-ester pectin powder without calcium salt. The effect of calcium salt on the GI value of bread and the blood glucose response after meal was observed.

Control Sample: 424 parts of high gluten flour, 195 parts of purified water, 4 parts of salt, 42 parts of erythritol, 24 parts of low-ester pectin powder, 6 parts of dried yeast, 86 parts of milk, 76 parts of light cream, 110 parts of eggs, and 32 parts of butter.

Test Sample Formulation: 422 parts of high gluten flour, 194 parts of purified water, 4 parts of salt, 42 parts of erythritol, 6 parts of dried yeast, 85 parts of milk, 75 parts of light cream, 109 parts of eggs, 32 parts of butter, and 30 parts of formulated pectin powder (24 parts of low-ester pectin powder, and 6 parts of calcium hydrogen phosphate powder).

The subject information, raw material, equipment and other information were shown in Example 2. The blood glucose test and GI analysis were performed according to the guidance of "Method for Measuring Food Glycemic Index by Health Industry Standard of the People's Republic of China" WS/T 652-2019.

Figure 15:
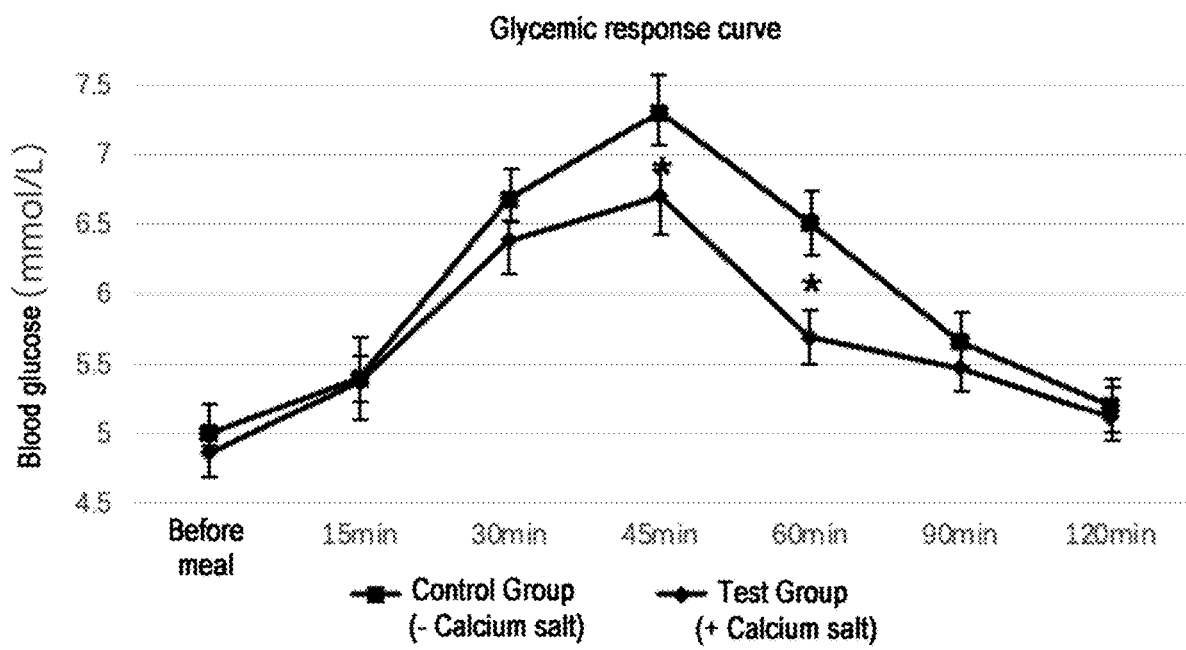
FIG. 15 gives the results of the effect of the addition of low-ester pectin powder alone and the formulated pectin powder containing low-ester pectin and calcium salt on the blood glucose response curve after a European bread meal.
Figure 16:
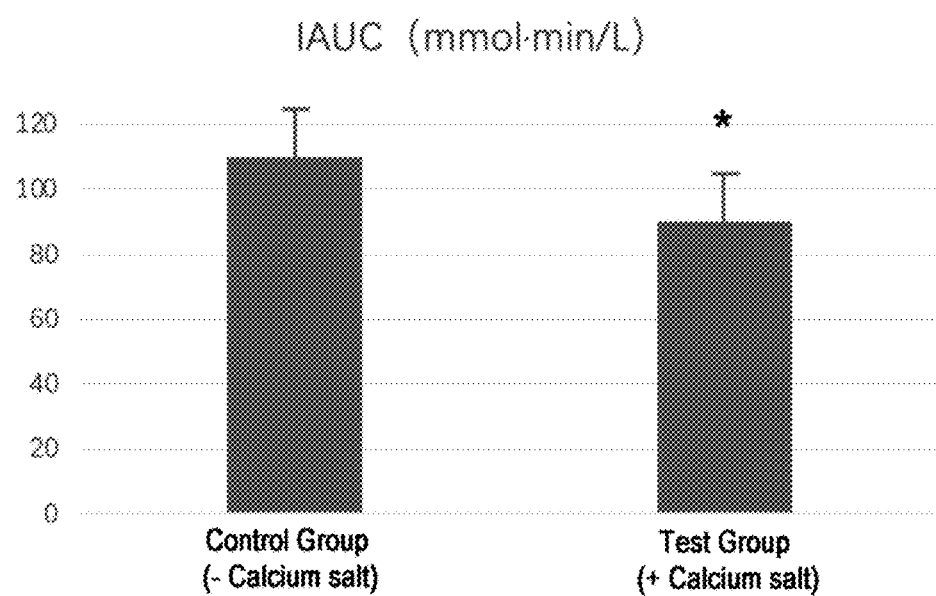
FIG. 16 shows the area growth under the blood glucose response curve (IAUC) for European bread with the addition of low-ester pectin powder alone and pectin powder formulated with low-ester pectin and calcium salt.

Results: 1) The blood glucose response curve and the area growth under the curve are shown in FIG. 15-16: compared with Control Group, the overall blood glucose response of Test Group was lower, especially the blood glucose difference at 45 and 60 minutes was significant (p<0.05), and the IAUC of the formulated pectin containing calcium salt group was significantly lower than that of the sample without calcium salt (p<0.05).

2) The Control (without calcium salt) Samples had a GI value of 67 and the Test Group (with calcium salt) had a GI value of 54.

The addition of calcium salt had a significant effect on the blood glucose response and the GI value of European bread. The addition of calcium salt had no effect on the preparation process of European bread, and no difference in dough state was observed during the preparation process. This was because the calcium salt was slightly soluble in water and easily soluble in hydrochloric acid, while only in the acidic environment of gastric acid, the bridging reaction would occur, which would influence food properties.

Secondly, a questionnaire survey was conducted on 12 subjects, and none of them had abdominal distension, diarrhea, nausea, abdominal pain, or increased exhaust, etc., indicating the bread was highly acceptable, and the smell and appearance were also evaluated, as an appropriate sweetness, fluffy and chewy mouthfeel.

Comparative Example 2

The sugar-free buns containing 6% formulated pectin were baked at 180ne of them had abdominal distension, diarrhea, nausea, abdominal pain, ium salt had no effect on the preparation process of European bread, and no difference in dough state was observed dut formulated pectin (180° C. baking temperature), sugar-free European bread with formulated pectin (180° C. baking temperature), and sugar-free European bread with formulated pectin (200° C. baking temperature).

The formulation of sugar-free European bread without formulated pectin:

458 parts of high gluten flour, 161 parts of purified water, 5 parts of salt, 46 parts of erythritol, 6 parts of dried yeast, 92 parts of milk, 80 parts of light cream, 118 parts of eggs, and 35 parts of butter.

The Formulation of Sugar-Free European Bread Added with Formulated Pectin:

412 parts of high gluten flour, 189 parts of purified water, 4 parts of salt, 41 parts of erythritol, 6 parts of dry yeast, 83 parts of milk, 73 parts of light cream, 107 parts of eggs, 31 parts of butter, and 53 parts of formulated pectin powder (low-ester pectin powder 48 wt %, guar gum 17 wt %, arabinoxylan 23 wt %, and calcium hydrogen phosphate 12 wt %).

The preparation method was as shown in Example 2, only the baking temperature of the bread was changed.

Figure 17:
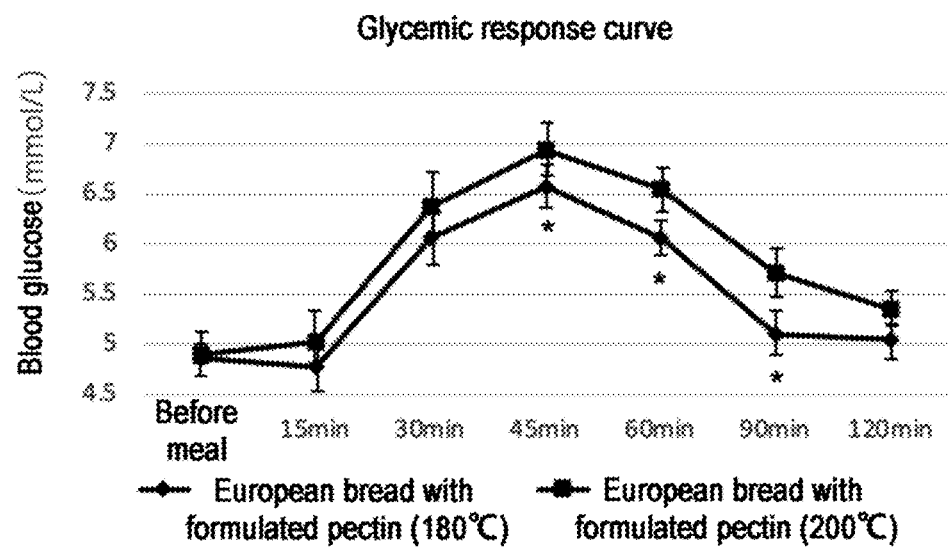
FIG. 17 shows postprandial glycemic response curves for European bread made with the same formulated pectin powder at different baking temperatures.
Figure 18:
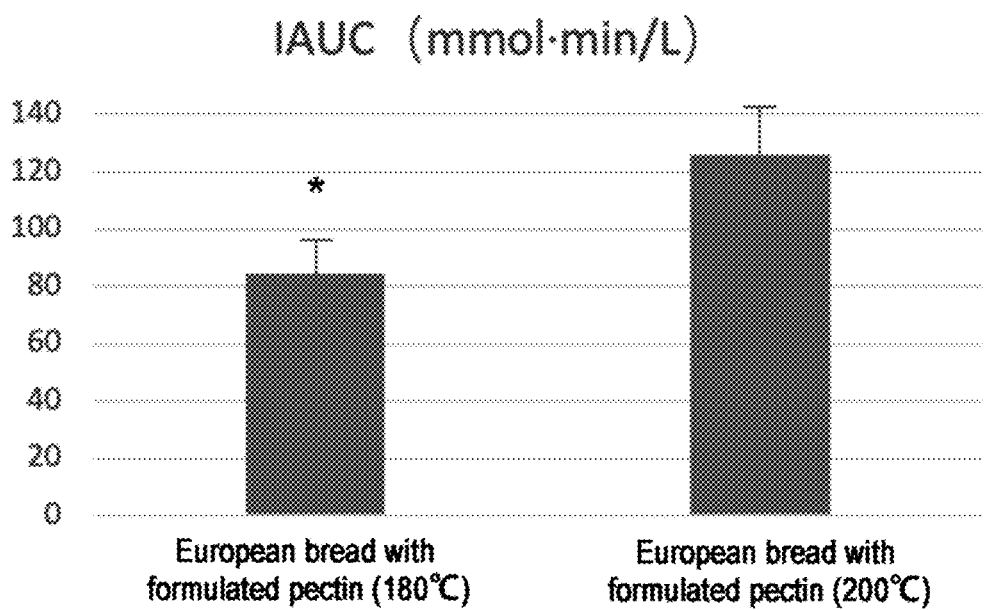
FIG. 18 gives the area growth under the postprandial glucose response curve (IAUC) for European bread made with the same formulated pectin powder at different baking temperatures.

Tests were as shown in Example 2, three kinds of European bread were subjected to postprandial blood glucose test and determination of GI value, and the results were as follows: 1) The blood glucose response curve and IAUC of European bread with formulated pectin baked at 200° C. were significantly higher than those of European bread baked at 180° C. (p<0.05, FIG. 17 and FIG. 18);

2) The GI value of the European bread baked at a baking temperature of 200° C. was also similar to that of the European bread without the formulated pectin in the Examples (74 vs. 76).

That is to say, in the case of baking at 200° C. for 20 minutes, the GI lowering effect of the formulated pectin fails, indicating that the application of the formulated pectin is limited by the temperature and time, but the cooking/baking temperature range thereof is large, which can almost completely cover the preparation temperature of all kinds of food (verified effective at 180° C. and below). Beyond this temperature and/or baking time, some effective ingredients in the formulated pectin will undergo structural change or decay, thus resulting in technical failure.

Although the present disclosure has been described in detail with reference to the foregoing embodiments, it is to be understood that the present disclosure is not limited to the disclosed embodiments, and other embodiments could be obtained according to the present embodiments without inventive step, which are within the protection scope of the present disclosure.

The invention claimed is:

1. A formulated pectin composition for lowering food glycemic index (GI) value, characterized in that the composition comprises the following components: pectin and metal salt of bivalent or trivalent cation, an esterification degree of the pectin is 20-50%, in the following weight percentages: the pectin 50-90% and the metal salt of bivalent or trivalent cation 10-50%.

2. The formulated pectin composition according to claim 1, characterized in that the composition further comprises at least one soluble polysaccharide.

3. The formulated pectin composition according to claim 2, characterized in that the composition comprises the components in the following weight percentages: the pectin 50-80%, the meta salt of bivalent or trivalent cation 10-35%, and the at least one soluble polysaccharide 10-30%.

4. The formulated pectin composition according to claim 2, characterized in that the composition comprises the components in the following weight percentages: the pectin 50-75%, the meta salt of bivalent or trivalent cation 10-33%, and the at least one soluble polysaccharide 15-35%.

5. The formulated pectin composition according to claim 2, characterized in that the composition comprises the components in the following weight percentages: the pectin 50-70%, the meta salt of bivalent or trivalent cation 10-25%, and the at least one soluble polysaccharide 19-40%.

6. The formulated pectin composition according to claim 1, characterized in that the meta salt of bivalent or trivalent cation comprises one or more selected from calcium, magnesium, ferrous, ferric, aluminum, and chromium salts.

7. A method for preparing a formulated pectin composition, characterized in that the method comprises the following steps: mixing meta salt of bivalent or trivalent cation, a part of pectin and one of soluble polysaccharides to obtain a premix; and total mixing a remaining part of the pectin with a remainder of the soluble polysaccharides and the premix to obtain the formulated pectin composition for lowering food glycemic index (GI) value, wherein the composition comprises the following components: the pectin and the metal salt of bivalent or trivalent cation, an esterification degree of the pectin is 20-50%, in the following weight percentages: the pectin 50-90% and the metal salt of bivalent or trivalent cation 10-50%.

* * * * *